US006586589B1

(12) United States Patent
Marritt

(10) Patent No.: US 6,586,589 B1
(45) Date of Patent: Jul. 1, 2003

(54) PROCESS FOR TREATING ALGINIC ACID TO PRODUCE POLYGULURONIC ACIDS OR CONCENTRATED SOLUTIONS FOR USE IN PRODUCING POLYGULURONIC ACIDS

(75) Inventor: William Alan Marritt, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/513,639

(22) Filed: Feb. 25, 2000

(30) Foreign Application Priority Data

Feb. 26, 1999 (JP) ........................................ 11-050670

(51) Int. Cl.[7] ............................ C07H 1/00; C07H 3/00

(52) U.S. Cl. ...................... 536/124; 536/123; 536/127; 536/128

(58) Field of Search ................................ 536/123, 124, 536/127, 128

(56) References Cited

FOREIGN PATENT DOCUMENTS

WO 9812228 3/1998

OTHER PUBLICATIONS

Shimokawa, T. et al. "Some properties and action mode of (1→4)–α–L–guluronan lyase . . . " Carbohydrate Research, vol. 304, No. 2 (1997) pp 125–132.

Heyraud, A. et al. "NMR spectroscopy analysis of oligoguluronates and oligomannuronates prepared . . . " Carbohydrate Research, vol. 289 (1996) pp 11–23.

Natsume, M., et al. "Isolation and characterization of alginate–derived oligosaccharides with root growth–promoting activities." Carbohydrate Research 258 (1994) pp. 187–197.

Yonemoto, Y., et al. "Promotion of Germination and Shoot Elongation of Some Plants . . . Lyase" Journal of Fermentation and Bioengineering, vol. 75,No. 1 (1993) pp. 68–70.

Haug, A., et al. "Studies on the Sequence of Uronic Acid Residues in Alginic Acid" Acta Chemica Scandinavica 21 (1967) pp. 691–704.

Winuristo, I., et al. "Biodegradability, Hydrolytic Degradability, and Builder Performance . . . Alginic Acid" Journal of Env. Polymer Degradation, vol. 4, No. 2 (1996) pp. 113–120.

Painter, T., "An apparent $^4C_1 \rightarrow {}^1C_4$ conformational transition in periodate–oxidised . . . effect in glycuronans" Carbohydrate Research, 71(1979) pp. C9–C12.

Haug et al., Studies on the Sequence of Uronic Acid . . . , ACTA CHEMICA SCAND., vol. 21, 1967, pp. 691–704.*

Winursito et al., J. of Environmental Polymer Degradation, vol. 4(2), 1996, pp. 113–120.*

* cited by examiner

*Primary Examiner*—James O. Wilson
*Assistant Examiner*—Howard V. Owens, Jr.
(74) *Attorney, Agent, or Firm*—Ladas & Parry

(57) ABSTRACT

A method of treating alginic acid to produce polyguluronic acids. The method involves: (a) mixing the alginic acid with water and lithium hydroxide in respective amounts sufficient to form a reaction mixture that is an acidic solution comprising at least 5 wt % of the alginic acid; (b) treating the reaction mixture, with addition of a periodic acid or a periodate salt, to effect an oxidation of the alginic acid that results in formation of (i) an oxidized product that, upon acidifying and heating, hydrolyzes into a plurality of components including polyguluronic acids that are substantially free of mannuronic acid contamination, with the polyguluronic acids having an average degree of polymerization of less than 20; and (ii) free iodine; (c) separating the free iodine from the reaction mixture; (d) acidifying and heating the reaction mixture to hydrolyze the oxidized product into the plurality of components; (e) adjusting the pH of the reaction mixture to form a precipitate of the polyguluronic acids; and (f) recovering the precipitate. There is also disclosed a method of treating alginic acid using steps (a), (b) and (c) to form concentrated solutions for use in producing polyguluronic acids.

22 Claims, No Drawings

PROCESS FOR TREATING ALGINIC ACID TO PRODUCE POLYGULURONIC ACIDS OR CONCENTRATED SOLUTIONS FOR USE IN PRODUCING POLYGULURONIC ACIDS

FIELD OF THE INVENTION

The present invention relates to a process for the manufacture of polyguluronic acids having degrees of polymerization less than 20 and substantially free of mannuronic acid contamination. It also relates to a process for the manufacture of concentrated alginic acid solutions for use in the formation of such polyguluronic acids.

PRIOR ART

Polyguluronic acids, because of their high affinity for calcium ions, are expected to have utility as scale inhibitors and scale deposit removers. The biodegradability of polyguluronic acids makes them particularly valuable with respect to environmental acceptability and waste disposal. Additionally, polyguluronic acid derivatives, in which a hydrophobic polymer is covalently attached to the reducing terminus of the polyguluronic acid, are useful as dispersants in pigment dispersed aqueous ink compositions for use in ink jet printing. Furthermore, polyguluronic acids, having low degrees of polymerization, have been shown to exhibit root-growth promoting activity in barley (M. Natsume et al., "Isolation and Characterization of Alginate-derived Oligosaccharides with Root-Growth Promoting Activities," Carbohydrate Research, 258, 187–197 (1994)). They have also been shown to exhibit germination and shoot-elongation promoting activity in unhulled rice and tobacco callus (Y. Yonemoto et al., "Promotion of Germination and Shoot Elongation of Some Plants by Alginate Oligomers Prepared with Bacterial Alginate Lyase," Journal of Fermentation and Bioengineering, 75, 68–70 (1993)). Based on studies of other polyuronic acids, low molecular weight polyguluronic acids might also be expected to exhibit antiviral, antitumoral, and plant-defense stimulating activities.

Alginic acids, from which polyguluronic acids can be obtained, are unbranched polymers of 1→4 linked α-L-guluronic acid (G) and β-D-mannuronic acid (M) of varying proportions and sequence. A typical structure of an alginic acid molecule may be represented schematically as follows:

| MMMMMM | GM | GGGGGGG | MGM | GGGGGGGGG | M | MGMGMGGM |
|---|---|---|---|---|---|---|
| M-block | | G-block | | G-block | | MG-block |

As can be seen from the above structure, the distribution of monomers in alginates is not random and there is no regular repeat unit. Alginic acids are best described as block copolymers in which there are polyguluronic acid sequences (G-blocks), polymannuronic acid sequences (M-blocks), and sequences containing random arrangements of both guluronic acid and mannuronic acid (MG-blocks).

It is well known that alginates, which are salts of alginic acid, can be hydrolyzed and that the hydrolysis products can be separated to give two predominantly homopolymeric fractions, polyguluronic acid and polymannuronic acid. The most often cited procedure for the preparation of the sodium salt of polyguluronic acid is a heterogeneous acidic hydrolysis method disclosed in A. Haug et al., "Studies on the Sequence of Uronic Acid Residues in Alginic Acid," Acta Chemica Scandinavica, 21, 691–704 (1967). The acidic hydrolysis described therein requires that one part of sodium alginate be suspended in twenty parts of 0.3 M hydrochloric acid solution. Because alginic acid is insoluble in the strongly acidic solution, the hydrolysis is a heterogeneous reaction. The heterogeneous mixture is heated for 10+hours at 100° C. and then the solid is separated from the acidic solution by centrifugation or filtration. After the collected solid is dissolved in water by neutralizing with dilute sodium hydroxide solution, twenty parts of 0.3 M hydrochloric acid solution are added to the solution resulting in reprecipitation of the partially hydrolyzed alginic acid. The resulting heterogeneous mixture is heated for an additional 10+hours at 100° C. and the solid is again separated from the acidic solution by centrifugation or filtration. The collected solid is dissolved in water by neutralizing with dilute sodium hydroxide solution and then sodium chloride and water are added to yield a solution which is 0.5 wt % alginic acid salt and 0.1 M sodium chloride. An approximately equal volume of 0.025 M hydrochloric acid solution is added to the alginic acid salt solution until a pH value of 2.85 is obtained. The precipitated solid is separated from the acidic solution by centrifugation or filtration. The isolated solid is dissolved in water by neutralizing with dilute sodium hydroxide solution and then precipitated with excess ethanol. The precipitated solid is washed with ethanol, washed with ether, and dried. The sodium salt of the polyguluronic acid prepared by this heterogeneous acidic hydrolysis method has an average degree of polymerization between 15 and 20. The mannuronic acid content is between 5 and 15% and the yield of product is between 15 and 20%.

During the course of the first step of the heterogeneous acidic hydrolysis, approximately 30% of the alginate goes into solution. An additional 15% of the original alginate goes into solution during the course of the second step. The insoluble fraction which is isolated after both steps contains both polyguluronic acid and polymannuronic acid. In the acidification of the dilute solution containing both sodium salts of polyguluronic acid and polymannuronic acid, polyguluronic acid is selectively precipitated.

Although the heterogeneous acidic hydrolysis method of A. Haug et al. is useful for laboratory scale preparations of polyguluronic acid, it would be difficult to implement on a larger scale, such as that which would be used in industrial production. This is because in the separation step of that method, the concentration of alginic acid is only a very dilute 0.25 wt %. Additionally, the method has multiple steps and is complicated.

In the same reference as that describing the heterogeneous acidic hydrolysis method, a homogeneous acidic hydrolysis procedure is also reported. In that procedure, a 1 wt % sodium alginate solution is mixed with an equal volume of a 0.025 M citrate buffer solution such that a combined solution having a pH value of 3.6 is obtained. The solution is boiled at reflux for 5+hours. Although a method for isolating polyguluronic acids is not reported, presumably a method similar to that used in the heterogeneous acidic hydrolysis method can be used.

Although the homogeneous acidic hydrolysis method of A. Haug et al. may be useful for laboratory scale preparations of polyguluronic acid, it also would be difficult to implement on a larger scale. In that method, the concentration of sodium alginate in the hydrolysis step is only a very dilute 0.5 wt %. Although one can easily conceive of increasing the concentration of sodium alginate, in practice this cannot be done. At concentrations slightly greater than 0.5 wt %, sodium alginate does not remain soluble throughout the hydrolysis reaction in the range of pH values at which the acidic hydrolysis is effected. The species which precipitate in the course of the hydrolysis are incompletely hydrolyzed and, although rich in guluronic acid, they contain significant amounts of mannuronic acid. Furthermore, the incompletely hydrolyzed species have degrees of polymerization of greater than 20. Because the homogeneous acidichydrolysis conditions are milder than those described above in the heterogeneous acidic hydrolysis procedure, the incompletely hydrolyzed species are not further hydrolyzed after precipitating from solution.

Another means of obtaining low molecular weight hydrolysis products of alginic acid is disclosed in a published study of the hydrolytic degradability of partially dicarboxylated alginic acid ("Biodegradability, Hydrolytic Degradability, and Builder Performance in Detergent Formulations of Partially dicarboxylated Alginic Acid," Journal of Environmental Polymer Degradation, 4, 113–121 (1996)). In that paper (which is hereby incorporated herein by reference), partially dicarboxylated alginic acid is prepared and then hydrolyzed to low molecular weight products. The hydrolysis products were only characterized by gel-permeation chromatography and, thus, their actual identity is unknown. However, it is reasonable to assume that the products were mixtures of the homopolymeric fractions, polyguluronic acids and polymannuronic acids. If one wanted to isolate the polyguluronic acids from those mixtures, presumably a procedure similar to that used in the heterogeneous acidic hydrolysis method of A. Haug et al. could be used.

The above described low molecular weight hydrolysis products of dicarboxylated alginic acid were obtained by using a three step process starting with alginic acid. In the first step, alginic acid was oxidized to partially diformylated alginic acid using a less than a stoichiometric amount of sodium periodate as the oxidant. The product was isolated and purified by dialysis. In the second step, the partially diformylated alginic acid was oxidized to partially dicarboxylated alginic acid using an excess of sodium chlorite as the oxidant. Again, the product was isolated and purified by dialysis. In the third step, the partially dicarboxylated alginic acid was dissolved in a buffer solution, having a pH value of 4, and incubated at 30° C. for periods of time up to 30 days. These same first two oxidation steps also have been reported in "An Apparent ${}^4C_{1\rightarrow}{}^1C_4$ Conformational Transition in Periodate-Oxidized Alginate,. Induced by Changes in pH and Ionic Strength: The Anomeric Effect in Glycuronans," Carbohydrate Research, 71, C9–C12 (1979). In that paper, aqueous bromine was used instead of sodium chlorite in the second oxidation step.

Although the above described three step process, in which partially dicarboxylated alginic acid is an intermediate product, may be useful for laboratory scale preparations of polyguluronic acid, it is not optimal for industrial production because the method has multiple steps and is complicated. Furthermore, it requires two different oxidants.

Thus, there remains a need for a method of manufacturing polyguluronic acids which can be carried out on an industrial scale.

SUMMARY OF THE INVENTION

It is an object of the present invention to provide a practical process for the manufacture of polyguluronic acids having a degree of polymerization less than 20 and substantially free of mannuronic acid contamination.

It is another object of the invention to provide a hydrolysis process using a solution of alginic acid or alginic salt in which the concentration of alginic acid or alginic salt is equal to or greater than 5 wt % throughout the process.

It is a further object of the invention to provide solutions of alginic acid or alginic salts for use in such hydrolysis process.

These and other objects of the invention may be achieved by virtue of the inventor's discovery that periodic acid $H_5IO_6$ and periodate salts, which include but are not limited to sodium periodate (metaperiodate), $NaIO_4$, sodium paraperiodate, $Na_3H_2IO_6$, and potassium periodate, $KIO_4$, will effect oxidation of concentrated solutions of alginic acid such that intermediate products which are easily hydrolyzed are obtained. It has been found that free iodine, and not iodates, can be made the major iodine containing product of the oxidation reaction. The implication of this finding is that multiple oxidation steps are being effected by one oxidant. Also, it has been found that 5 wt % or greater solutions of alginic acid, for the purpose of periodate oxidation, can be obtained by using lithium hydroxide to neutralize the alginic acid. These combined findings form a basis of the present invention.

According to the invention there is provided a method of treating alginic acid to produce polyguluronic acids, said method comprising the steps of:

(a) mixing the alginic acid with water and lithium hydroxide in respective amounts sufficient to form a reaction mixture that is an acidic solution comprising at least 5 wt % of the alginic acid;

(b) treating the reaction mixture, with addition of an oxidizing agent selected from the group consisting of a periodic acid and a periodate salt, to effect an oxidation of said alginic acid that results in formation of (i) an oxidized product that, upon acidifying and heating, hydrolyzes into a plurality of components including polyguluronic acids that are substantially free of mannuronic acid contamination, with the polyguluronic acids having an average degree of polymerization of less than 20; and (ii) free iodine;

(c) separating the free iodine from the reaction mixture;

(d) acidifying and heating the reaction mixture to hydrolyze the oxidized product into the plurality of components;

(e) adjusting the pH of the reaction mixture to form a precipitate consisting essentially of the polyguluronic acids; and (f) recovering the precipitate.

In a preferred embodiment of the invention, a sufficient amount of the lithium hydroxide is mixed with the water and alginic acid in step (a) to form the acidic solution with a pH value of between 3.8–5.0. In another preferred embodiment, the oxidizing agent is added in step (b) in a less than stoichiometric amount. Preferably, the less than stoichiometric amount of the oxidizing agent is greater than 5 mole % and less than 50 mole %.

In accordance with the invention, the oxidizing agent may comprise a periodate salt selected from the group consisting of sodium periodate ($NaIO_4$), sodium paraperiodate ($Na_3H_2IO_6$) and potassium periodate ($KIO_4$). The alginic acid may be oxidized in step (b) in an oxidation reaction that comprises an initial exothermic stage and a completion stage, with the method comprising heating the reaction mixture after the initial exothermic stage to effect a completion of the oxidation reaction. The method may also comprise cooling the reaction mixture during said initial exothermic stage.

In accordance with other preferred embodiments, the reaction mixture is acidified to a pH value of less than or equal to 3.5 in step (d). The acidified reaction mixture may be heated in step (d) at a temperature greater than or equal to 80° C. The polyguluronic acids may be selectively precipitated in step (e) by adjusting the pH of the reaction mixture to a pH value greater than or equal to 3.0 and less than or equal to 3.4. The alginic acid in step (a) may have a weight average molecular weight of less than or equal to 50,000 g/mole. The precipitate in step (e) preferably comprises less than 8 wt % of mannuronic acid, and more preferably comprises less than 5 wt % of mannuronic acid.

There is also provided in accordance with another embodiment of the invention a method of treating alginic acid to produce a concentrated solution for use in producing polyguluronic acids, and concentrated solutions produced by such method. The method in accordance with this embodiment comprises:

(a) providing an alginic acid that comprises guluronic acid monomers and mannuronic acid monomers; and (b) mixing the alginic acid with water and lithium hydroxide in respective amounts sufficient to produce the concentrated solution having a pH between 3.8–5.0 and containing at least 5 wt % of the alginic acid. In a preferred aspect of this embodiment, the guluronic acid monomers are present in the alginic acid with respect to the mannuronic acid monomers in a ratio of greater than about 1:1 and less than about 2:1. In another preferred aspect, the method may further comprise the steps of:

(c) treating the concentrated solution by addition of an oxidizing agent selected from the group consisting of a periodic acid and a periodate salt, to effect an oxidation of said alginic acid that results in formation of (i) an oxidized product that, upon acidifying and heating, hydrolyzes into a plurality of components including polyguluronic acids that are substantially free of mannuronic acid contamination, with the polyguluronic acids having an average degree of polymerization of less than 20; and (ii) free iodine; and (d) separating the free iodine from the treated solution.

DETAILED DESCRIPTION

A practical process for the manufacture of polyguluronic acids having degrees of polymerization less than 20 and substantially free of mannuronic acid contamination is disclosed herein. The average degree of polymerization of the polyguluronic acids formed in a preferred embodiment of the invention is between about 8 and about 20. Substantially free of mannuronic acid is defined as less than or equal to 8 wt % and more preferably less than or equal to 5 wt. %.

As noted above, a three step process, in which sodium periodate was used in one step, has been reported for the preparation of low molecular weight hydrolysis products of alginic acid. In the step in which sodium periodate was used as the oxidant, vicinal glycols in the alginic acid were oxidatively cleaved with concomitant formation of carbonyl compounds.

The resulting alginic acid oxidation product was isolated and characterized as partially diformylated alginic acid. Based on the stoichiometry of this oxidation reaction, sodium iodate is the iodine containing product. In the above second oxidation step, the partially diformylated alginic acid was oxidized using either sodium chlorite or aqueous bromine. In this step, some or all of the carbonyl functionalities were oxidized to carboxylic acid functionalities. The resulting alginic acid oxidation product was isolated and characterized as partially dicarboxylated alginic acid.

Without intending to be bound by theory, in the present invention, an oxidation reaction involving the above two separate oxidation steps is presumed to be effected by only one oxidant, periodic acid or a periodate salt. This conclusion is based on the observation that free iodine, and not iodate, is the major iodine containing product under the conditions of the present invention. Again, without intending to be bound by theory, an oxidation reaction comprising the two oxidation steps is believed to occur according to the following stoichiometric equations, in which sodium periodate is used as the oxidant. Similar equations can be written for periodic acid or other periodate salts.

$$^{-}CHOH^{-}CHOH^{-}+NaIO_4 \rightarrow 2(^{-}CHO)+NaIO_3$$

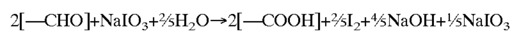

$$2[—CHO]+NaIO_3+\tfrac{2}{5}H_2O \rightarrow 2[—COOH]+\tfrac{2}{5}I_2+\tfrac{4}{5}NaOH+\tfrac{1}{5}NaIO_3$$

The sodium iodate, which is a product of the first oxidation step, is further reduced to iodine, resulting in the formation of partially dicarboxylated alginic acid. Based on these equations, all of the iodate is not consumed in the second oxidation step.

Even if the reaction chemistry of periodic acid or periodate salts with alginic acid is not occurring exactly as described above, the utility of periodic acid or periodate salts for oxidizing alginic acid to intermediate products, which are easily hydrolyzed, is a substantial benefit of the present invention. These easily hydrolyzable intermediate products are obtained when the oxidation reaction is driven to completion, such that an unchanging amount of free iodine separates from the reaction mixture.

The alginic acid to be used as a starting material in the present invention may be any commercially available alginic acid. However, because polyguluronic acids are the target product, an alginic acid which is rich in guluronic acid is preferred. Alginic acids extracted from the seaweeds *Laminaria hyperborea* and *Lessonia flavicans* are particularly rich in guluronic acid, having guluronic acid to mannuronic acid ratios of approximately two to one. For the purpose of keeping the viscosity of.the hydrolysis solution relatively low, an alginic acid having a low average molecular weight is preferred as a starting material. In the present invention, an alginic acid having a weight average molecular weight of less than or equal to 50,000 g/mole is preferred. A preferred starting material is "Ultra Low Viscosity Alginic Acid" which is available from Kibun Food Kemifa, 2-1-1Irifune, Chuo-ku, Tokyo.

In a preferred embodiment of the present invention, 5 wt. % or greater solutions of alginic acid, for the purpose of periodate oxidation, can be obtained by using lithium hydroxide to neutralize the alginic acid. For starting material alginic acids rich in guluronic acid, concentrated solutions can only be obtained when lithium hydroxide is used to neutralize the alginic acid. For starting material alginic acids which are not so rich in guluronic acid (and, thus, not so desirable for obtaining polyguluronic acids), other alkali metal hydroxides, such as sodium hydroxide, potassium hydroxide, rubidium hydroxide, and cesium hydroxide can be used. However, regardless of the composition of the starting material alginic acid, lithium hydroxide neutralization is capable of yielding a more concentrated solution than those obtained using other alkali metal hydroxides. Because of its ease of handling, lithium hydroxide monohydrate is the preferred solid form of lithium hydroxide for use in the present invention.

Organic bases, such as amines, can also be used to neutralize alginic acid such that concentrated solutions are obtained. However, organic bases are not useful in the present invention, because the protonated organic bases, which result from neutralization, are easily oxidized by periodic acid and periodate salts. With the oxidation target being the alginic acid and not a protonated organic base, competitive oxidation between the alginic acid and a protonated organic base would be undesirable and wasteful, if organic bases were used to neutralize alginic acid.

As the first step in a preferred embodiment of the present invention, the alginic acid is dissolved in water by neutralization with lithium hydroxide to yield a solution containing 5 wt. % or more of alginic acid. The amount of lithium hydroxide used in the neutralization is that amount which results in a solution having a pH value greater than or equal to 3.8 and less than or equal to 5.0. For commercial grades of alginic acid, the resulting solution in this pH range generally will contain small amounts of insoluble impurities. If deemed necessary, these impurities can be easily removed by filtration prior to the addition of periodic acid or periodate salts. At pH values less than 3.8, not all of the alginic acid dissolves. At pH values greater than 5.0, the oxidation reaction of periodic acid or periodate salts with alginic acid, resulting in the formation of free iodine as the iodine containing product, is unacceptably sluggish. For "Ultra Low Viscosity Alginic Acid" from Kibun Food Kemifa, neutralization with 77 mol % of lithium hydroxide monohydrate gives a solution with a pH value of about 4.1.

In the next step, the alginic acid may be oxidized by means of the addition of a less than stoichiometric amount of periodic acid or a periodate salt. Periodic acid has the following molecular formula: $H_5IO_6$. Periodate salts include but are not limited to sodium periodate (metaperiodate), $NaIO_4$, sodium paraperiodate, $Na_3H_2IO_6$, and potassium periodate, $KIO_4$. The less than stoichiometric amount of periodic acid or a periodate salt of the present invention is greater than 5 mole % and less than 50 mole %. For stoichiometric values less than 5 mole %, the polyguluronic acids obtained by acid hydrolysis have average degrees of polymerization of 20 or more. For stoichiometric values greater than 50 mole %, the yield of polyguluronic acids is unacceptably poor, typically less than 5%. The periodic acid or periodate salts may be added as solids or aqueous solutions, with solids being preferred. Vigorous stirring and cooling of the alginic acid solution is recommended during the addition and subsequent initial reaction of the periodic acid or periodate salts. The cooling is preferred because the first step of the oxidation reaction is exothermic. Preferred cooling temperatures are between −5° C. and 20° C.

In the next step, the oxidation reaction may be driven to completion, with or without a catalyst, such that free iodine separates from the reaction mixture. For example, when the reaction mixture is allowed to warm to ambient temperature after the completion of the exothermic first oxidation step, iodine begins to precipitate. The simplest means of driving this reaction, such that an unchanging amount of free iodine separates from the reaction mixture, is to heat the reaction mixture. As solid iodine has a high vapor pressure, heating is best carried out in either a closed system or in a vented system, in which the vented iodine passes through an iodine specific scrubber solution. The temperature of the heated reaction mixture is preferably above 40° C. to obtain reasonably fast conversion of the intermediate oxidant(s) to free iodine. Although the inventor of the present invention has not investigated potential catalysts, which may accelerate the conversion of intermediate oxidant(s) to free iodine. Preferred heating temperatures are between 40° C. and 120° C.

After driving the reaction to completion, the free iodine may be separated from the reaction mixture by conventional methods. Such methods include filtration, centrifuging, and steam distillation. A purification and recovery process for recycling iodine to periodic acid or periodate salts is disclosed in U.S. Pat. No. 3,607,694, U.S. Pat. No. 3,681,213, and U.S. Pat. No. 3,703,508, which are hereby incorporated by reference.

In a next step, the reaction mixture may be acidified and heated such that the oxidized intermediate products are hydrolyzed to lower molecular weight components, which include polyguluronic acids. As noted previously, the ease of hydrolysis of the oxidized intermediate products is a substantial benefit of the present invention. While heating or prior to heating, the reaction mixture is acidified to a pH value less than or equal to 3.5. At pH values greater than 3.5, the hydrolysis is unacceptably sluggish. In the pH range greater than or equal to about 3.2 and less than or equal to 3.5, the acidic hydrolysis reaction is homogeneous. At pH values less than about 3.2, the acidic hydrolysis reaction is heterogeneous. In general, lower pH values are preferable in terms of increasing the rate of the acidic hydrolysis reaction.

In this step, the acidified reaction mixture may be heated at a temperature greater than or equal to 80° C. for a time period sufficient to hydrolyze the intermediate products to lower molecular weight components, including polyguluronic acids. Although temperatures less than 80° C. may be used, the rate of hydrolysis will be correspondingly slower. The hydrolysis may be carried out in pressure vessels, such that temperatures greater than the boiling point of water at atmospheric pressure can be used. In general, a temperature of less than about 120° C. is preferred because decomposition of the polysaccharide products, in competition with the hydrolysis reaction, is significant at temperatures greater than about 120° C.

This hydrolysis step may be carried out under an ambient atmosphere or an inert atmosphere, with an inert atmosphere being preferred because air oxidation of the products is minimized. An inert atmosphere of high purity nitrogen is preferable from the standpoint of cost.

The time period which is sufficient to hydrolyze the intermediate products to lower molecular weight components including polyguluronic acids depends on several factors. One factor is the temperature of the acidified reaction mixture. A second factor is the initial concentration of the starting material alginic acid. A third factor is the amount of periodic acid or a periodate salt, relative to the amount of starting material alginic acid, used to oxidize the alginic acid. As noted above, a fourth factor is the pH value of the acidified reaction mixture. To determine the completeness of the hydrolysis reaction, a variety of analytical techniques may be used. Typically, aliquots of the acidified reaction mixture are removed periodically and the polyguluronic fraction is isolated. This fraction then may be analyzed by a variety of techniques, including $^1$H NMR and gel permeation chromatography.

After the hydrolysis is judged to be complete, the acidified reaction mixture may be cooled to ambient temperature and the pH of the reaction mixture is adjusted, such that polyguluronic acids are selectively precipitated. Polyguluronic acids may be selectively precipitated by adjusting the pH of the reaction mixture to a value greater than or equal 3.0 and less than or equal to 3.4. The reported $pK_a$ values of polyguluronic acid and polymannuronic acid are 3.65 and 3.38, respectively. Based on this difference, adjustment of the pH of the reaction mixture, such that a pH value within a preferred range of the present invention is obtained, results in selective precipitation of polyguluronic acid from polymannuronic acid, which remains in solution. Any water soluble acid or base may be used in the present invention for adjusting the pH. Acids are preferably non-oxidizing inorganic acids, an example of which is hydrochloric acid. A preferred base is an aqueous solution of lithium hydroxide monohydrate.

After selective precipitation, the polyguluronic acids may be separated by conventional methods. Such methods include filtration and centrifugation. The product can then be washed with acidified water and/or an aqueous alcohol solution and then dried by conventional methods.

The polyguluronic acids prepared according to the method of the present invention have degrees of polymerization of less than 20 and contain less than 8% mannuronic acid as determined by $^1$H NMR. A sample for NMR analysis is prepared by dissolving the polyguluronic acid in deuterium oxide ($D_2O$) by neutralization with a solution of sodium deuteroxide (NaOD) in deuterium oxide. At 90° C., the H-1 (internal) peaks of guluronic acid and mannuronic acid in polyuronic acids occur at 5.05 ppm and 4.67~4.70 ppm, respectively, relative to the internal reference standard, sodium 3-(trimethylsilyl) propionate-$d_4$. From the integrated areas of these two peaks, the amount of mannuronic acid impurity in the polyguluronic acid product can be calculated. At 90° C., the H-1 (reducing end) peaks of the $\alpha$ and $\beta$ anomers of polyguluronic acid and polymannuronic acid occur at 5.21 ppm and 4.84~4.89 ppm, respectively, relative to the internal reference standard, sodium 3-(trimethylsilyl) propionate-$d_4$. From a comparison of the combined integrated areas of the $\alpha$ and $\beta$ anomer peaks to the combined integrated areas of all H-1 peaks ($\alpha$ anomer peak, $\beta$ anomer peak, internal guluronic acid H-1 peak, and internal mannuronic acid H-1 peak), the degree of polymerization of the polyguluronic acid product can be calculated.

EXAMPLE

The present invention will be further clarified by the following specific example. All operations were carried out in a well ventilated draft hood.

PREPARATION OF POLYGULURONIC ACID 150 g of alginic acid (Ultra Low Viscosity Alginic Acid; Kibun Food Kemifa; Japan) was slurried in 600 mL of deionized water in a 1000 mL beaker. To this slurry was added 27.65 g of lithium hydroxide monohydrate, while stirring the slurry with an overhead mechanical stirrer. The alginic acid dissolved to yield a solution with a pH value of approximately 4.1. Deionized water was added to give a total solution volume of 750 mL. Next, the solution was chilled in an ice bath to a temperature less than 5° C. While stirring the chilled solution vigorously using the mechanical stirrer, 43.75 g of sodium periodate was added rapidly. After the chilled solution was stirred vigorously for 1 hour, the ice bath was removed and the stirred solution was allowed to warm to ambient temperature. Next, 8 g of concentrated hydrochloric acid solution was added with stirring. The beaker was covered and set aside to stand for 12 hours. During this time period, some solid iodine settled on the bottom of the beaker. The reaction mixture was transferred to a 2 L thick walled, lidded PFA container. The threads on the opening of the container were wrapped with Teflon tape and the lid was tightly sealed. The sealed container was submerged using a lead weight in a 70° C. water bath for 8 hours. After cooling to room temperature, the sealed container was opened and the mixture was filtered through a sheet of #4 Whatman filter paper. The iodine, which collected on the filter paper, was disposed of by standard procedures. The filtrate was transferred to a round bottom flask to which a reflux condenser was attached. After adding 2 mL of n-octyl alcohol to the solution, the mixture was magnetically stirred and heated to reflux for 2 hours. While continuing to stir and reflux the mixture, concentrated hydrochloric acid was added gradually through the reflux condenser until the pH of the mixture reached a value of 1.0. The pH value was estimated using Hydrion Microfine pH test paper having a range of 0.8 to 2.0. This addition of acid resulted in the precipitation of an off-white solid. The mixture was heated at reflux for an additional 7 hours. After allowing the mixture to cool to ambient temperature, the solid was collected by vacuum filtration using a fine porosity (pore size: 16–40 microns) fritted glass filter. The wet solid was transferred to a 1L beaker along with approximately 600 mL of deionized water. While stirring the slurry, triethylamine was added gradually until all of the solid dissolved. The pH of the resulting solution was approximately 7 as determined using Microfine pH test paper having a range of 5.5 to 8.0. The resulting solution was filtered through a sheet of #2 Whatman filter paper. Next, 6N hydrochloric acid was added gradually to the solution which contained the low molecular weight polyguluronic and polymannuronic acids, until the pH of the mixture reached a value of 3.1, as was determined using Microfine pH test paper having a range of 1.3 to 4.4. The solid which precipitated was collected by vacuum filtration using a fine porosity (pore size: 16–40 microns) fritted glass filter. The wet solid was transferred to a 1L beaker along with approximately 250 mL of deionized water. While stirring the slurry, 500 mL of 95% ethanol was added gradually with stirring. After stirring for 1 hour, the solid was collected by vacuum filtration using a fine porosity (pore size: 16–40 microns) fritted glass filter. The solid was washed with several portions of 95% ethanol and then set aside to air dry. Finally, the solid was dried under vacuum to a constant weight. The yield of product was 17 g. Approximately 10 mg of sample was dissolved in 0.4 mL of deuterium oxide by addition of a small amount of sodium deuteroxide in deuterium oxide using a microsyringe. The $^1$H NMR spectrum was measured at 80° C. and the peaks corresponding to the H-1 (internal) peak of guluronic acid in polyuronic acids, the H-1 (internal) peak of mannuronic acid in polyuronic acids, the H-1 (reducing end) peak of the $\alpha$ anomers, and the H-1 (reducing end) peak of the $\beta$ anomers were integrated. The integration values are given in Table 1 as shown below. This region of the spectrum is shown in the figure of the drawing.

TABLE I

| Proton | Chemical Shift (ppm) (vs. Sodium 3-(trimthylsilyl)propionate-$d_4$. | Integration Value |
|---|---|---|
| H-1 (internal) of mannuronic acid | 4.67~4.70 | 257 |
| H-1 (reducing end) of $\beta$ anomers | 4.84~4.89 | 218 |
| H-1 (internal) of guluronic acid | 5.05 | 3952 |
| H-1 (reducing end) of $\alpha$ anomers | 5.21 | 71 |

The amount of mannuronic acid impurity in the polyguluronic acid product was calculated from the integration values for the H-1 (internal) peaks of guluronic acid and mannuronic acid. The calculation is as follows:

$$\text{mannuronic acid impurity (\%)} = 100 \times 257/(257+3952) = 6.1\%$$

The degree of polymerization of the polyguluronic acid product was calculated from the combined integrated areas of the $\alpha$ and $\beta$ anomer peaks and the combined integrated areas of all H-1 peaks ($\alpha$ anomer peak, $\beta$ anomer peak, internal guluronic acid H-1 peak, and internal mannuronic acid H-1 peak). The calculation is as follows:

$$\text{degree of polymerization} = (257+3952+218+71)/(218+71) = 15.6$$

While there have been shown and described specific embodiments of the present invention, further modifications and improvements will occur to those skilled in the art. It should be understood, therefore, that this invention is not limited to the particular forms shown and that the appended claims are intended to cover all modifications that do not depart from the spirit and scope of this invention as defined by the following claims.

What is claimed is:

1. A method of treating alginic acid to produce polyguluronic acids, said method comprising the steps of:

(a) mixing the alginic acid with water and lithium hydroxide in respective amounts sufficient to form a reaction mixture that is an acidic solution comprising at least 5 wt % of the alginic acid;

(b) treating the reaction mixture, by addition of an oxidizing agent selected from the group consisting of a periodic acid and a periodate salt, to effect an oxidation of said alginic acid that results in formation of (i) an oxidized product that, upon acidifying and heating, hydrolyzes into a plurality of components including polyguluronic acids that are substantially free of mannuronic acid contamination, with the polyguluronic acids having an average degree of polymerization of less than 20; and (ii) free iodine;

(c) separating the free iodine from the reaction mixture;

(d) acidifying and heating the reaction mixture to hydrolyze the oxidized product into the plurality of components;

(e) adjusting the pH of the reaction mixture to form a precipitate consisting essentially of the polyguluronic acids; and (f) recovering the precipitate.

2. The method according to claim 1, wherein a sufficient amount of the lithium hydroxide is mixed with the water and alginic acid in step (a) to form the acidic solution with a pH value of between 3.8–5.0.

3. The method according to claim 1, wherein the oxidizing agent is added in step (b) in a less than stoichiometric amount.

4. The method according to claim 3, wherein the less than stoichiometric amount of the oxidizing agent is greater than 5 mole % and less than 50 mole %.

5. The method according to claim 1, wherein the oxidizing agent comprises a periodate salt selected from the group consisting of sodium periodate ($NaIO_4$), sodium paraperiodate ($Na_3H_2IO_6$) and potassium periodate ($KIO_4$).

6. The method according to claim 3, wherein said alginic acid is oxidized in step (b) in an oxidation reaction that comprises an initial exothermic stage and a completion stage, said method comprising heating the reaction mixture after the initial exothermic stage to effect a completion of the oxidation reaction.

7. The method according to claim 6, comprising cooling the reaction mixture during said initial exothermic stage.

8. The method according to claim 1, wherein the reaction mixture is acidified to a pH value of less than or equal to 3.5 in step (d).

9. The method according to claim 8, wherein the acidified reaction mixture is heated in step (d) at a temperature greater than or equal to 80° C.

10. The method according to claim 1, wherein the polyguluronic acids are selectively precipitated in step (e) by adjusting the pH of the reaction mixture to a pH value greater than or equal to 3.0 and less than or equal to 3.4.

11. The method according to claim 1, wherein the alginic acid in step (a) has a weight average molecular weight of less than or equal to 50,000 g/mole.

12. The method according to claim 1, wherein the precipitate in step (e) comprises less than 8 wt % of mannuronic acid.

13. The method according to claim 1, wherein the precipitate in step (e) comprises less than 5 wt % of mannuronic acid.

14. A method of treating alginic acid to produce a concentrated solution for use in producing polyguluronic acids, said method comprising:

(a) providing an alginic acid that comprises guluronic acid monomers and mannuronic acid monomers; and (b) mixing the alginic acid with water and lithium hydroxide in respective amounts sufficient to produce the concentrated solution having a pH between 3.8–5.0 and containing at least 5 wt % of the alginic acid.

15. The method according to claim 14, wherein the guluronic acid monomers are present in the alginic acid with respect to the mannuronic acid monomers in a ratio of greater than about 1:1 and less than about 2:1.

16. The method according to claim 14, further comprising the steps of:

(c) treating the concentrated solution by addition of an oxidizing agent selected from the group consisting of a periodic acid and a periodate salt, to effect an oxidation of said alginic acid that results in formation of (i) an oxidized product that, upon acidifying and heating, hydrolyzes into a plurality of components including polyguluronic acids that are substantially free of mannuronic acid contamination, with the polyguluronic acids having an average degree of polymerization of less than 20; and (ii) free iodine; and (d) separating the free iodine from the treated solution.

17. The treated solution produced by the process of claim 16.

18. The concentrated solution produced by the process of claim 14.

19. The treated solution produced by the process of claim 16.

20. The method according to claim 1, wherein said alginic acid is oxidized in step (b) in a reaction that is driven to completion without use of a catalyst.

21. The method according to claim 1, wherein said alginic acid is oxidized in step (b) in a reaction that is driven to completion with use of a catalyst.

22. The method according to claim 6, wherein the method consists essentially of said steps (a)–(f).

* * * * *